(12) United States Patent
Nahidi et al.

(10) Patent No.: US 12,466,472 B2
(45) Date of Patent: Nov. 11, 2025

(54) STEERING WHEEL ANGLE SENSOR ESTIMATION AND VALIDATION SYSTEM

(71) Applicant: GM GLOBAL TECHNOLOGY OPERATIONS LLC, Detroit, MI (US)

(72) Inventors: Seyedeh Asal Nahidi, North York (CA); SeyedAlireza Kasaiezadeh Mahabadi, Novi, MI (US); Douglas J. Spry, Clarkston, MI (US); Ramakrishna Kamath Vijayakumar, Troy, MI (US); Cody Dunham, Linden, MI (US); Ibrahim A. Badiru, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 72 days.

(21) Appl. No.: 18/639,084

(22) Filed: Apr. 18, 2024

(65) Prior Publication Data

US 2025/0326427 A1    Oct. 23, 2025

(51) Int. Cl.
*B62D 5/04*    (2006.01)
*B62D 5/00*    (2006.01)

(52) U.S. Cl.
CPC .......... *B62D 5/0484* (2013.01); *B62D 5/003* (2013.01); *B62D 5/0409* (2013.01); *B62D 5/046* (2013.01); *B62D 5/049* (2013.01)

(58) Field of Classification Search
CPC ...... B62D 5/003; B62D 5/0409; B62D 5/046; B62D 5/0484; B62D 5/049
See application file for complete search history.

(56) References Cited

U.S. PATENT DOCUMENTS

| | | | |
|---|---|---|---|
| 11,420,670 B2* | 8/2022 | Shin | B62D 5/005 |
| 2023/0202562 A1* | 6/2023 | Lee | B62D 5/001 |
| | | | 701/41 |

FOREIGN PATENT DOCUMENTS

| | | |
|---|---|---|
| DE | 102018114988 A1 | 12/2019 |
| DE | 102019212712 A1 | 2/2020 |
| DE | 112019006345 A1 | 9/2021 |
| DE | 102022214324 A1 | 6/2023 |

* cited by examiner

*Primary Examiner* — Mark L. Greene
(74) *Attorney, Agent, or Firm* — Ingrassia Fisher & Lorenz, LLP | IF&L

(57) ABSTRACT

A vehicle steering control system including a road wheel angle sensor for detecting a road wheel angle, a steering feedback motor for rotating a steering wheel in response to the road wheel angle and for generating a steering torque value in response to a physical rotation of the steering wheel by a vehicle driver, a processor for receiving the road wheel angle and the steering torque value, for estimating a steering wheel angle in response to the steering torque value and for generating a validated steering angle in response to a difference between the road wheel angle and the steering wheel angle being less than a threshold value, and a steering controller for controlling the steering of a vehicle in response to the validated steering angle.

20 Claims, 4 Drawing Sheets

300

400

STEERING WHEEL ANGLE SENSOR ESTIMATION AND VALIDATION SYSTEM

The present disclosure relates generally to programming motor vehicle control systems. More specifically, aspects of this disclosure relate to systems, methods and devices to estimate a steering wheel angle to control a steer by wire steering system in response to a detection of a road wheel angle and an output torque of a steering feedback motor.

Steering system connections in a conventional automotive vehicle have traditionally been provided via direct mechanical linkages between a steering device and the front wheels of the vehicle. For example, in a rack and pinion steering system the rotation of a steering wheel rotates a pinion gear that is engaged with mating notches or teeth in a rack portion of the steering system. Tie rods connect the rack portion to the wheels, so that any rotational motion of the steering wheel ultimately rotate the road wheels to a resultant steering angle, which may vary depending on the steering ratio provided by the steering system. Other steering linkage designs may be used instead of a rack and pinion design, such as worm gears used in a re-circulating ball steering system. In either example, however, all control linkages are purely mechanical in nature.

By way of contrast, in a steer-by-wire steering system, an electronically controlled steering actuator is positioned on or in proximity to the front drive axle, and one or more transducers and/or other sensors to measure or detect the steering request or input to a steering device, which is usually a circular steering wheel. The sensors can be configured to measure a steering angle at the steering wheel. The electronic input signals representing these measured or detected values are then transmitted electrically to a steering actuator, which executes a steering maneuver in response to the electronic input signals.

In steer-by-wire systems, where a physical connection between the steering wheel and wheels is absent, redundant steering angle sensors are crucial. This ensures continued functionality even if one sensor fails. By comparing data from multiple sensors, the system can detect discrepancies and maintain control, preventing a loss of directional stability and potential accidents. This redundancy is paramount for safety-critical systems like steering. Since steering wheel angle sensors are critical sensors for establishing a trajectory of a vehicle, vehicles must include redundancy of steering angle detection to perform safely. However, when one steering angle sensor is determined to be faulty, this redundancy is lost. Accordingly, it would be desirable to provide systems and methods for real-time steering angle detection and validation in response to a failure of one or more steering wheel angle sensors. Furthermore, other desirable features and characteristics of the present disclosure will become apparent from the subsequent detailed description and the appended claims, taken in conjunction with the accompanying drawings and the foregoing technical field and background.

SUMMARY

Disclosed herein are vehicle control systems and methods and related control logic for provisioning vehicle control systems, methods for making and methods for operating such systems, and motor vehicles equipped with steer by wire steering control systems. By way of example, and not limitation, there are presented various embodiments of systems for providing a steering wheel angle sensor estimation and validation system in a steer-by-wire steering controller equipped motor vehicle disclosed herein.

In accordance with an exemplary embodiment, a vehicle control system including a road wheel angle sensor configured to detect a road wheel angle, a steering feedback motor configured to rotate a steering wheel in response to the road wheel angle and to generate a steering torque value in response to a physical rotation of the steering wheel by a vehicle driver, a processor configured to receive the road wheel angle and the steering torque value, to estimate a steering wheel angle in response to the steering torque value and to generate a validated steering angle in response to a difference between the road wheel angle and the steering wheel angle being less than a threshold value, and a steering controller configured to control the steering of a vehicle in response to the validated steering angle.

In accordance with another aspect of an exemplary embodiment wherein the road wheel angle is detected in response to a failure of a first steering angle sensor.

In accordance with another aspect of an exemplary embodiment wherein the steering torque value is determined using a Kalman filter in response to a requested motor command, a torque sensor output, and an input noise.

In accordance with another aspect of an exemplary embodiment wherein the steering controller is configured to perform a dynamic backup steering control function in response to the validated steering angle.

In accordance with another aspect of an exemplary embodiment wherein the processor is further configured to perform a diagnostic and remedial action in response to the difference between the road wheel angle and the steering wheel angle exceeding the threshold value.

In accordance with another aspect of an exemplary embodiment, further including a steering angle sensor and wherein the road wheel angle is detected in response to a failure of the steering angle sensor.

In accordance with another aspect of an exemplary embodiment wherein the steering controller is configured to perform a TVSC in response to the validated steering angle.

In accordance with another aspect of an exemplary embodiment wherein the threshold value is determined in response to a host vehicle speed, a time duration, and a magnitude of an estimated angle error.

In accordance with another aspect of an exemplary embodiment wherein the steering controller further includes a steering motor for adjusting the road wheel angle in response to the validated steering angle.

In accordance with another aspect of an exemplary embodiment, a method for controlling the steering of a vehicle including detecting, by a road wheel actuator, a road wheel angle, detecting, by a processor, a steering torque value from a steering feedback motor in response to a physical rotation of a steering wheel by a vehicle driver, determining a steering wheel angle in response to the steering torque value, generating, by the processor, a validated steering angle in response to a difference between the road wheel angle and the steering wheel angle being less than a threshold value, controlling, by a steering controller, a vehicle steering direction in response to the validated steering angle.

The method for controlling the steering of a vehicle of claim 10 wherein the road wheel actuator includes a road wheel angle sensor for detecting the road wheel angle and steering motor for controlling the road wheel angle in response to a steering control signal generated by the steering controller.

In accordance with another aspect of an exemplary embodiment, further including detecting a failure of a steering wheel angle sensor and wherein the road wheel angle is detected in response to the failure of the steering wheel angle sensor.

In accordance with another aspect of an exemplary embodiment wherein the validated steering angle is refined using a Kalman filter in response to the steering torque value, the road wheel angle and an input noise.

In accordance with another aspect of an exemplary embodiment wherein the threshold value is determined in response to the steering wheel angle and a steering angle rate of change.

In accordance with another aspect of an exemplary embodiment wherein the steering feedback motor is mechanically coupled to the steering wheel of the vehicle.

In accordance with another aspect of an exemplary embodiment wherein the validated steering angle is used to perform at least one of a dynamic backup steering control function and a torque vector steering control function.

In accordance with another aspect of an exemplary embodiment wherein the road wheel actuator includes a first road wheel angle sensor and a second road wheel angle sensor and wherein the road wheel angle is determined in response to a mathematical combination of a first output of the first road wheel angle sensor and a second output of the second road wheel angle sensor.

In accordance with another aspect of an exemplary embodiment wherein the steering controller is further operative to generate a steering control signal in response to the validated steering angle and wherein the steering control signal is coupled to a steering motor within the road wheel actuator.

In accordance with another aspect of an exemplary embodiment, a steering control system in a host vehicle including a road wheel actuator having a road wheel angle sensor configured to detect a road wheel angle and a steering motor configured to control the road wheel angle in response to a steering control signal, a steering wheel actuator including a steering angle sensor configured to detect a steering wheel angle and a steering feedback motor configured to rotate a steering wheel in response to the road wheel angle and configured to generate a steering torque value in response to a physical rotation of the steering wheel by a vehicle driver, and an electronic control unit configured to receive the road wheel angle and the steering torque value, to estimate the steering wheel angle in response to a failure of the steering angle sensor and the steering torque value, and to generate the steering control signal corresponding to the steering wheel angle in response to a difference between the road wheel angle and the steering wheel angle being less than a threshold value, wherein the steering of the host vehicle is controlled in response to the steering control signal.

In accordance with another aspect of an exemplary embodiment, further including an inertial measurement unit configured to detect a lateral acceleration of the host vehicle and wherein the electronic control unit is further configured to perform a torque vector steering control function to calculate a required torque vectoring command in response to the lateral acceleration and wherein the steering control signal is determined in response to the required torque vectoring command to directionally control the host vehicle.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Achieving a reliable control system design is an ongoing process of improvement, especially in the case of a safety critical mechanism. A framework to capture measurement inaccuracies in a real time fashion, an algorithmic method to systematically detect failures, and validate the information used by control systems all play significant roles in control system reliability and robustness. As steering wheel angle is a critical measurement, there are three sets of independent measurements available sourced from primary, secondary, and tertiary steering angle sensors (SAS). The validation of steering angle information can be challenging if the hand wheel actuator (HWA) fails, resulting in loss of primary and secondary SAS. The currently disclosed systems and methods implement an algorithmic solution to estimate hand wheel steering angle based on torque measurements/estimations and mathematical models, validate tertiary SAS output, detect potential failures, determine steering degradation state and execute associated remedial actions.

Figure 1:
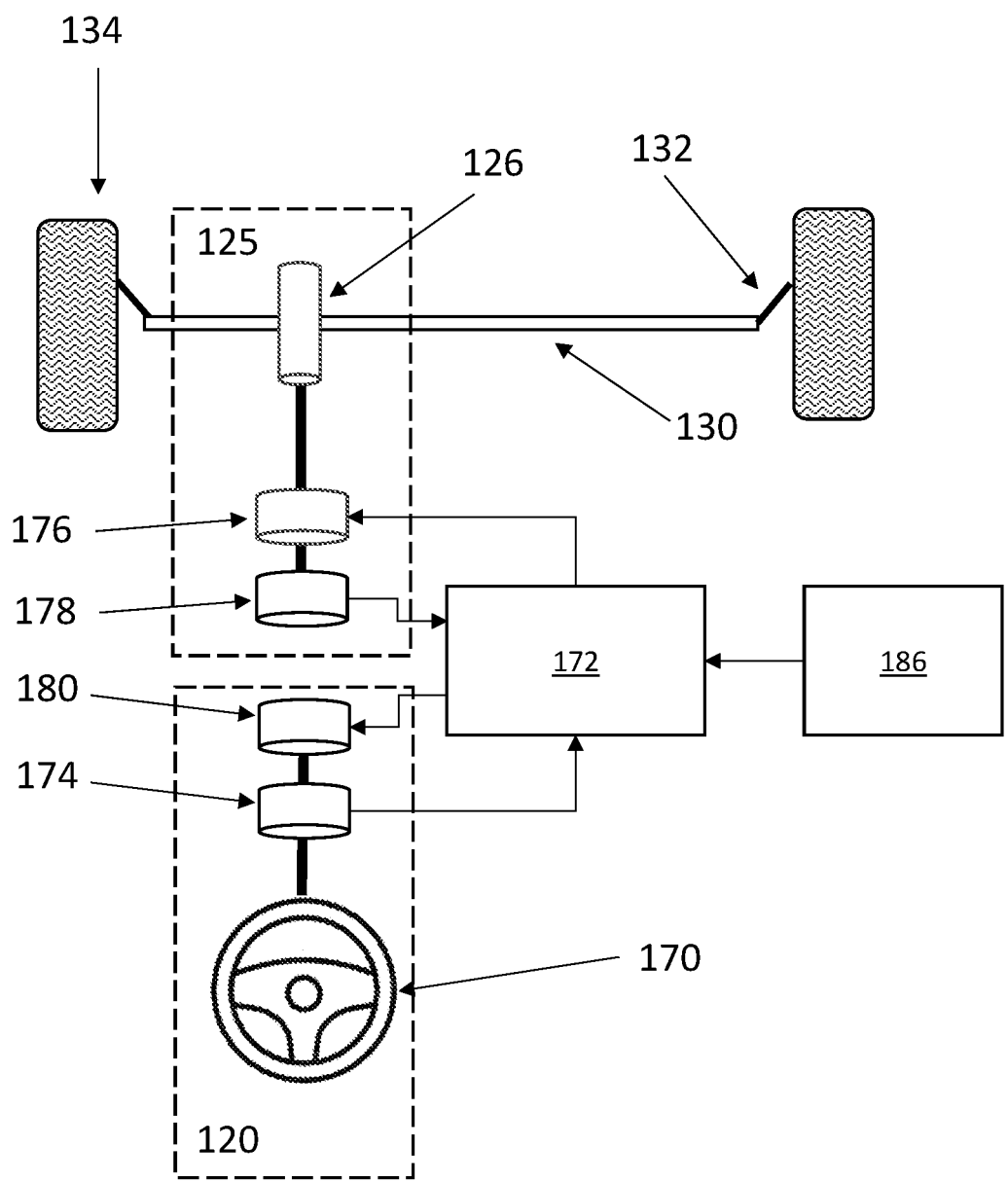
FIG. 1 is a functional block diagram of a vehicle that includes a steer by-wire steering system including a steering wheel angle sensor estimation and validation system in accordance with embodiments of the present disclosure.

FIG. 1 illustrates a steer-by-wire steering system 100 including a steering wheel angle sensor estimation and validation system in accordance with embodiments of the present disclosure. An exemplary vehicle includes a steering system 100, a hand wheel actuator (HWA) 120, road wheel actuator (RWA) 125 and electronic control unit (ECU) 172. The HWA 120 includes steering wheel 170, SAS 174 and steering feedback motor 180. The SAS 174 detect the movement of the steering wheel 170 and transmit that command to the steer-by-wire ECU 172, which then delivers the command to the RWA 125. The RWA 125 includes the steering motor 176 which controls a rack and pinion 126 and wheel sensors 178 which deliver feedback signals regarding movement of the wheels 134 back to the ECU 172. The ECU 172 then delivers these feedback signals to the feedback motor 180 which then moves the steering wheel 170 to provide feedback to the driver, similarly to the feedback provided by the wheels in a manual steering vehicle. Tie rods 132 connect a rack 130 to the wheels 134 and convert the movement of the rack 130 into rotation of the wheels 134.

The steering system 100 is configured to measure a steering wheel angle (SWA). The SWA is the rotational angle that the steering wheel deviates, either left or right, from an unturned position. The unturned position of the steering wheel corresponds with a wheel straight forward driving configuration, wherein the vehicle travels straight forward or backward. A driver of the vehicle may cause the steering wheel to deviate from the unturned position, for example in order to cause the vehicle to turn. Thus, the driver of the vehicle may induce a SWA. SWA may be measured by the SAS 174 coupled to the steering column of the vehicle. The SAS 174 may be operatively coupled to the ECU 172, either via direct electronic connection, or via a connection through another computing or processing system of the vehicle. The ECU 172 uses the SWA measurement in the methods and systems of the present disclosure.

In some exemplary embodiments, the vehicle may be configured to measure a yaw component of vehicle movement. The yaw component may be used to calculate an estimated vehicle lateral acceleration. For example, a vehicle travelling straight ahead (or directly in reverse) experiences no yaw, or lateral acceleration (Ay). Conversely, if the vehicle initiates a turn while moving forward (or in reverse), the vehicle occupants will feel a slight pull to the left or right, as the vehicle turns to the left or right, respectively. Lateral acceleration may be measured with respect to gravitational acceleration. The yaw component may be measured in the vehicle using an accelerometer or the like, such as an inertial measurement unit (IMU) 186. The IMU 186 may be operatively coupled to the ECU 172, either via direct electronic connection, or via connection through another computing or processing system of the vehicle. The ECU 172 uses the yaw measurement in the methods and systems of the present disclosure.

The steering system determines 100 the direction and magnitude of a driver steering command, matching the steering wheel with the wheels. Located within HWA 120, the SAS 174 always have more than one sensor packaged together in a single unit for redundancy, accuracy, and reliability. In some exemplary embodiments, the steering system 100 can further include a tertiary SAS in addition to the primary and secondary rotational sensors within the SAS 174. Tertiary SAS is a third set of SAS measurement information that is available in the absence or failure of the primary and secondary rotational sensors in the SAS 174. Tertiary SAS measures desired steering angle commanded by driver and passes this information to the ECU 172. For example, in the case of a HWA failure, a dynamic backup steering control (DSBC) function can calculate steering road wheel angle command depending on vehicle speed and other significant parameters for the RWA 125 to execute. In the case of HWA 120 and RWA 125 simultaneous failure, a torque vector steering control (TVSC) function can be used to calculate the required torque vectoring commands, such as yaw moment to directionally control the vehicle.

Figure 2:
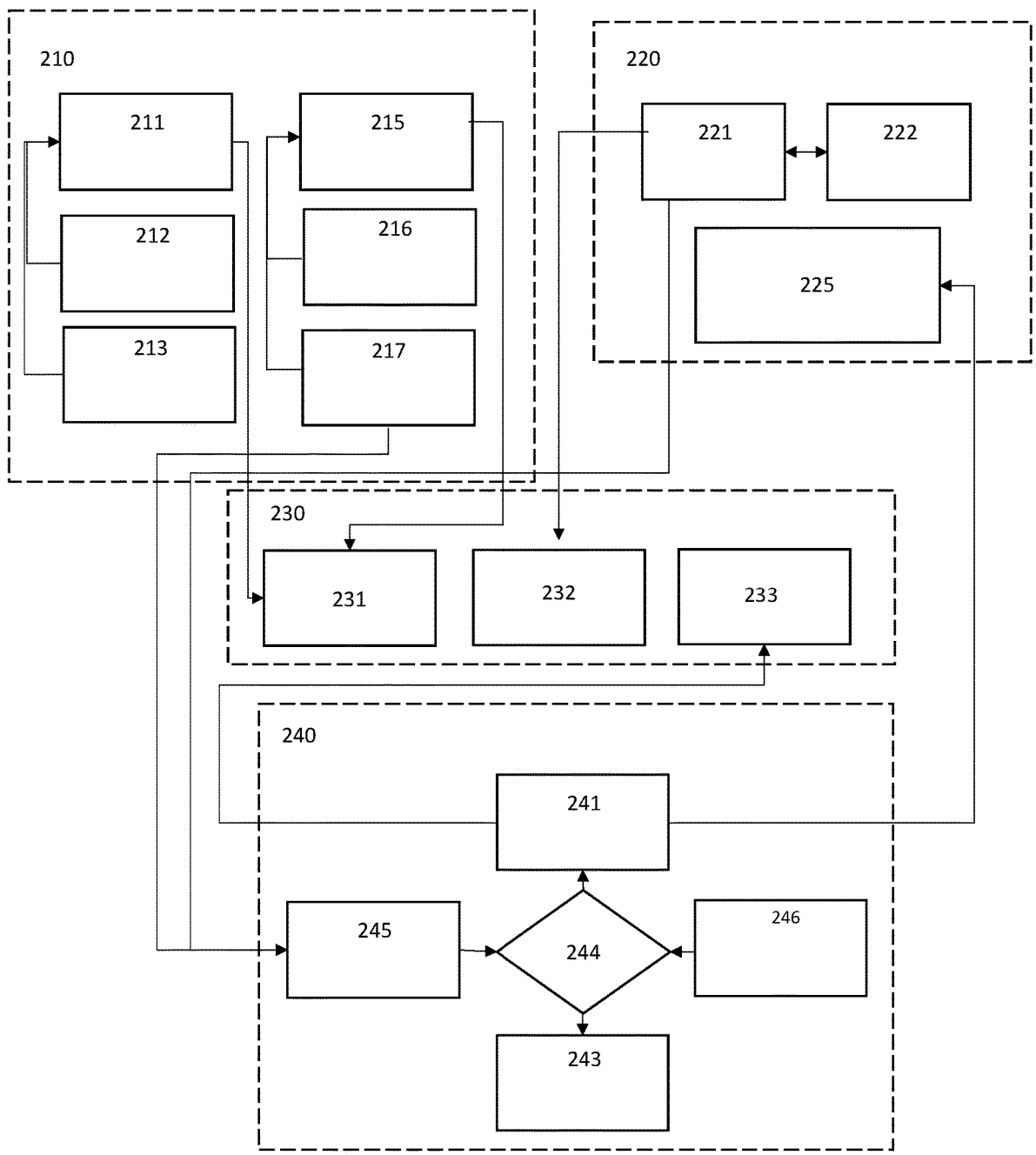
FIG. 2 is illustrative of a block diagram of an exemplary implementation of a system for implementing a steering wheel angle sensor estimation and validation system in a motor vehicle according to an exemplary embodiment of the present disclosure.

Turning now to FIG. 2, a block diagram illustrating an exemplary implementation of a system 200 for implementing a steering wheel angle sensor estimation and validation system in a motor vehicle is shown. The exemplary system 200 can include a hand wheel actuator (HWA) 210, a road wheel actuator (RWA) 220, an electronic control unit (ECU) 230 and a tertiary sensor validation unit 240.

The HWA 210 can include a primary HWA 211 including a primary angle sensor 212 and a primary torque sensor 213, and a secondary HWA 215 including a secondary angle sensor 216 and a secondary torque sensor 217. The RWA 220 includes an RWA secondary A sensor 221 and an RWA secondary B sensor 222 for detecting a wheel position value of the RWA 220. In some exemplary embodiments, road wheel angle can be determined in response to RWA secondary sensors 221, 222 mounted on the steering column or directly on the RWA 220 itself. The RWA secondary sensors 221, 222 can measure the rotational movement and translate it into an electrical signal representing the steering angle. Alternatively, the road wheel angle can be determined using linear position sensors which can track the movement of components within the steering mechanism to determine the resulting wheel angle. A tertiary steering angle can be determined in response to the outputs of the RWA secondary sensors 221, 222.

The primary HWA 211 and the secondary HWA 215 are configured to couple SWA values to a primary supervisory control 231 of the ECU 230. The RWA wheel position value is coupled from the RWA 220 to the secondary supervisor control 232 of the ECU 230. Due to the safety criticality of the steering mechanism, a coherency check takes place in real time between primary angle sensor 212, secondary angle sensor 216 and the tertiary steering angle from the RWA secondary sensors 221, 222 to assure the accuracy and validity of sensory information. The primary supervisory control 231 can determine a consistency between the first SWA from the primary HWA 211 and the secondary SWA from the secondary HWA 215. If the two SWA are indicative of the same SWA value within a threshold deviation indicating that neither the primary angle sensor 212 or the secondary angle sensor 216 are not failed, the operation of control system 200 would be normal and no validation is required using the tertiary steering angle. If the two SWA values are not within a threshold deviation indicating a failure of at least one of the primary angle sensor 212 and the secondary angle sensor 216 has failed, validation is required using the tertiary steering angle.

A problem arises when, in absence of primary angle sensor 212 and secondary angle sensor 216 functionality, the tertiary steering angle from the RWA secondary sensors 221, 222 cannot be validated and there is no further physical sensor duplication available for this information to reconstruct a replacement signal in case of fault detection for validation purposes and determining appropriate remedial action. If it is determined that both the primary angle sensor 212 or the secondary angle sensor 216 of the HWA 210, the steering control system 200 would be limited to DSBC and TVSC (depending on RWA failure condition) and the tertiary steering angle would become the crucial source of angle measurement and is required to be validated for safety reasons. A tertiary sensor validation algorithm 240 can be employed to estimate SWA 245 based on torque measurements/estimations from the primary torque sensor 213 and the secondary torque sensor 217 using a mathematical model to validate tertiary SAS output, detect potential failures, determine steering degradation state and execute associated remedial actions. If the estimated SWA 245 correlates to the tertiary steering angle from the RWA secondary sensors 221, 222, the tertiary steering angle 241 is confirmed 243 and is coupled to the DSBC 225 and the TVSC 233. If the tertiary steering angle 241 deviates from the estimated SWA 245 by an amount greater than a threshold value, the system is configured to set a diagnostic and remedial action 246.

In some exemplary embodiments, a mitigation strategy can be designed in case of invalidity of tertiary sensor angle output. In case of primary/secondary SAS failures, the tertiary SAS can be utilized to allow steering control through DSBC and TVSC. In case of DSBC taking over steering control, a fixed steering ratio can be defined allowing the driver to continue driving during the key cycle for a longer period of time compared to TVSC. If the tertiary angle sensor is failed and can not be validated, a set of recommended remedial actions can be considered for varying levels of sensor degradation. In some exemplary embodiments, calibration parameters can be considered different for DSBC and TVSC as severity of the error can have a more significant effect in case of activation of indirect steering control functions.

Figure 3:
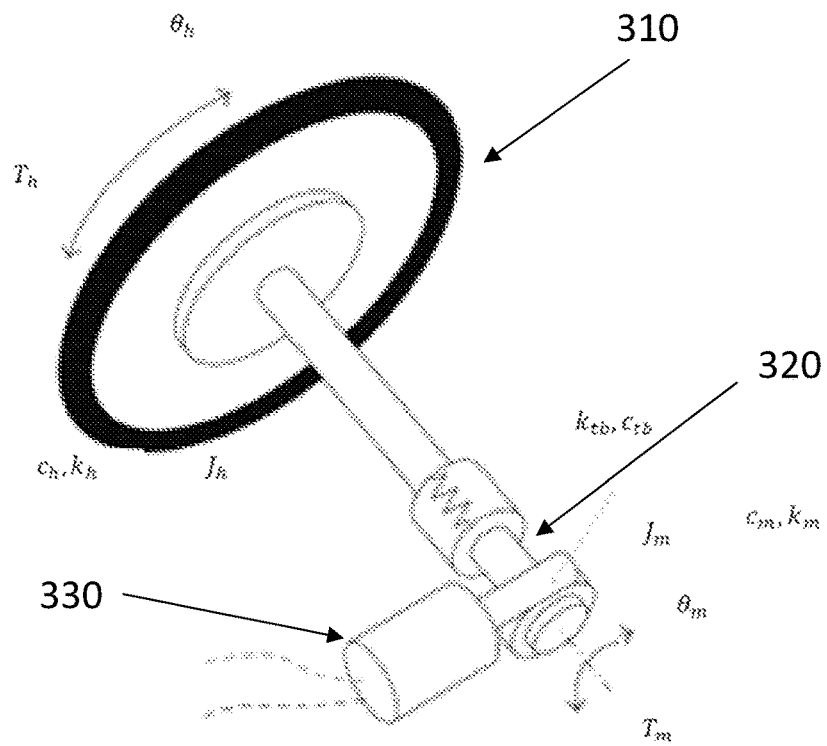
FIG. 3 shows an exemplary implementation of a hand wheel actuator for performing a steering wheel angle sensor estimation and validation in accordance with embodiments of the present disclosure.

Turning now to FIG. 3, a diagram illustrating an exemplary implementation of a hand wheel actuator 300 for performing a steering wheel angle sensor estimation and validation in accordance with embodiments of the present disclosure is shown. The tertiary sensor validation algorithm 240 of FIG. 2 can be used to validate the accuracy of the tertiary angle sensor measurement and be used for potential failure detection in case of loss of HWA primary and secondary steering angle sensors. The tertiary sensor validation algorithm 240 of FIG. 2 can be further employed to set internal diagnostics in case of validity of tertiary sensor unit to communicate driver steering input with DSBC to generate required road steering command if HWA failed and set internal diagnostics in case of validity of tertiary sensor unit to communicate driver steering input with TVSC to generate yaw moment to directionally control the vehicle command if HWA and RWA failed. In addition, the algorithm can be configured to set internal diagnostics and decide on remedial actions, such as a driver information center message, in case of invalidity of tertiary sensor output.

The tertiary sensor validation algorithm performs multiple steps to protect against tertiary SAS failure and performs remedial actions to ensure system accuracy. In order to estimate the steering wheel angle, some sensory information and a hand wheel actuator model are employed. An observer is designed utilizing a state space model and required sensory information to estimate the steering wheel angle independent from the steering angle measurement unit. Then, a comparison is performed between estimated and measured steering angle and based on the validity investigation results, adequate diagnostic countermeasures are set.

An exemplary HWA model is utilized to explain the relationship between different sensory/non-sensory information and physical parameters of the HWA 300. Since the torsional stiffness of the torque sensor is relatively low, the HWA 300 can be divided into two parts: the hand wheel assembly 310 and the steering column assembly 320. The hand wheel assembly 310 consists of the hand wheel and part of the column that is the district between the hand wheel 310 and the torque sensor. The steering column assembly 320 consists of the remaining part of the steering column, road feedback motor 330, and its reducer. Each of the two assemblies has one rotational degree, the angle of steering wheel, and the angle of the steering column. The 2DOF dynamic model of the hand wheel steering block can be written as follows:

$$J_h \ddot{\theta}_h = -k_h \theta_h - c_h \dot{\theta}_h + T_h - T_{tb}$$

$$T_{tb} = k_{tb}(\theta_c - \theta_h) + c_{tb}(\dot{\theta}_c - \dot{\theta}_h)$$

$$J_m \ddot{\theta}_c = -k_m \theta_c - c_m \dot{\theta}_c + T_{tb} - T_m$$

Consider a 1 DOF dynamic model for road feedback motor 330 with time constant $\tau_m$ for torque evolution and distinguish between requested vs delivered motor torque:

$$\tau_m \dot{T}_m + T_m = T_{m,req}$$

where θ_h and θ_c are the steering wheel and column angles, respectively. k_h, k_m, and k_tb are the stiffnesses of the steering hand wheel, motor, and torsion bar, respectively. T_h is the driver torque input and T_tb is the measured torque by torque sensor. J_h and J_m are the equivalent moment of inertia of steering wheel and motor, respectively. c_h, c_m and, c_tb denote the equivalent damping coefficients of steering hand wheel, motor, and torsion bar, respectively. T_m and T_(m,req) represent delivered and requested motor torque, respectively and τ_m is the associated motor time constant.

In this step, an observer is designed to estimate steering hand wheel angle based on available state-space model, parameters, and inputs. A Kalman Filter based method can be utilized to estimate steering hand wheel angle using the following state space model:

$$A = \begin{bmatrix} 0 & 1 & 0 & 0 & 0 \\ -\frac{k_{tb}+k_h}{J_s} & -\frac{c_{tb}+c_h}{J_s} & \frac{k_{tb}}{J_s} & \frac{c_{tb}}{I_s} & 0 \\ 0 & 0 & 0 & 1 & 0 \\ \frac{k_{tb}}{J_m} & \frac{c_{tb}}{J_m} & -\frac{k_{tb}+k_m}{J_m} & -\frac{c_{tb}+c_m}{J_m} & -\frac{1}{J_m} \\ 0 & 0 & 0 & 0 & -\frac{1}{\tau_m} \end{bmatrix},$$

$$B = \begin{bmatrix} 0 & 0 \\ 0 & \frac{1}{J_h} \\ 0 & 0 \\ 0 & 0 \\ \frac{1}{x_m} & 0 \end{bmatrix} C_{plant\ model} = \begin{bmatrix} k_{tb} & c_{tb} & -k_{tb} & -c_{tb} & 0 \\ 1 & 0 & 0 & 0 & 0 \\ 0 & 0 & 0 & 0 & 1 \end{bmatrix},$$

$$C_{observer} = \begin{bmatrix} k_{tb} & c_{tb} & -k_{tb} & -c_{tb} & 0 \\ 0 & 0 & 0 & 0 & 1 \end{bmatrix}, D = [0]_{3 \times 2}$$

$$\dot{x} = Ax + Bu + w$$

$$y = Cx + Du + V$$

where W is process noise and V is sensor noise, the state variable, input, and output vectors can be defined as:

$$x' = \{\theta_h \ \dot{\theta}_h \ \theta_m \ \dot{\theta}_m \ T_m\}, u = \{T_{m,req} \ T_d\}, y'_{plant\ model}$$
$$= \{T_{tb} \ \theta_h \ T_m\}, y'_{observer}$$
$$= \{T_{tb} \ T_m\}$$

Figure 4:
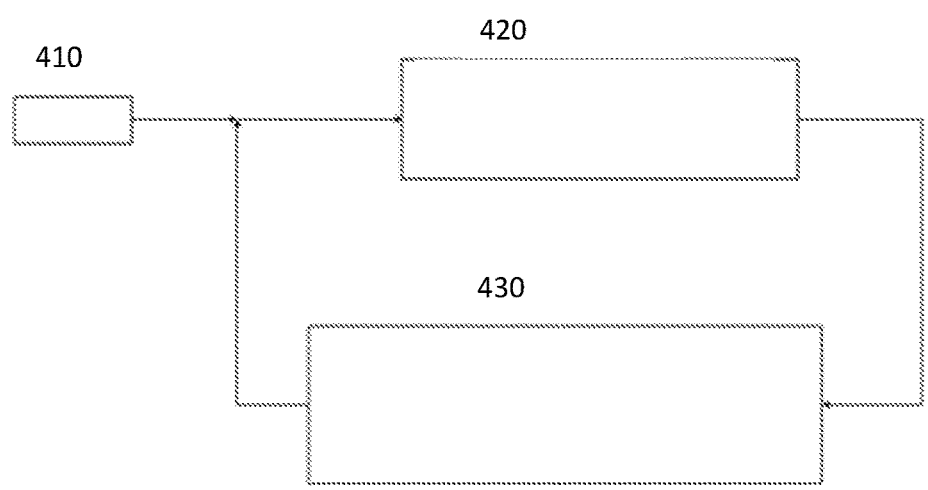
FIG. 4 shows a flow chart illustrating an exemplary implementation of a Kalman filter for steering wheel angle sensor estimation and validation in accordance with embodiments of the present disclosure.

Turning now to FIG. 4, a flow chart illustrating an exemplary implementation of a method 400 for providing a Kalman filter for steering wheel angle sensor estimation and validation in accordance with embodiments of the present disclosure is shown. The method 400 is first operative to initiate 410 the filter. The method 400 next predicts 420 the values for X, P and Z. The method 400 next corrects 430 the predicted values in response to the initial values and the predicted values.

x: State vector, representing the true state of the system.

P: State covariance matrix, representing the uncertainty or error in the state estimate.

A: State transition matrix, describing how the state evolves over time.

B: Control input matrix, if applicable, representing the effect of external control inputs on the state.

u: Control input vector, if applicable, representing the control inputs applied to the system.

Q: Process noise covariance matrix, representing the uncertainty or error in the process model.

H: Measurement matrix, relating the state to the measurements.

Z: Measurement vector, representing the observed measurements.

R: Measurement noise covariance matrix, representing the uncertainty or error in the measurements.

K: Kalman gain matrix, used to incorporate measurements into the state estimate.

Figure 5:
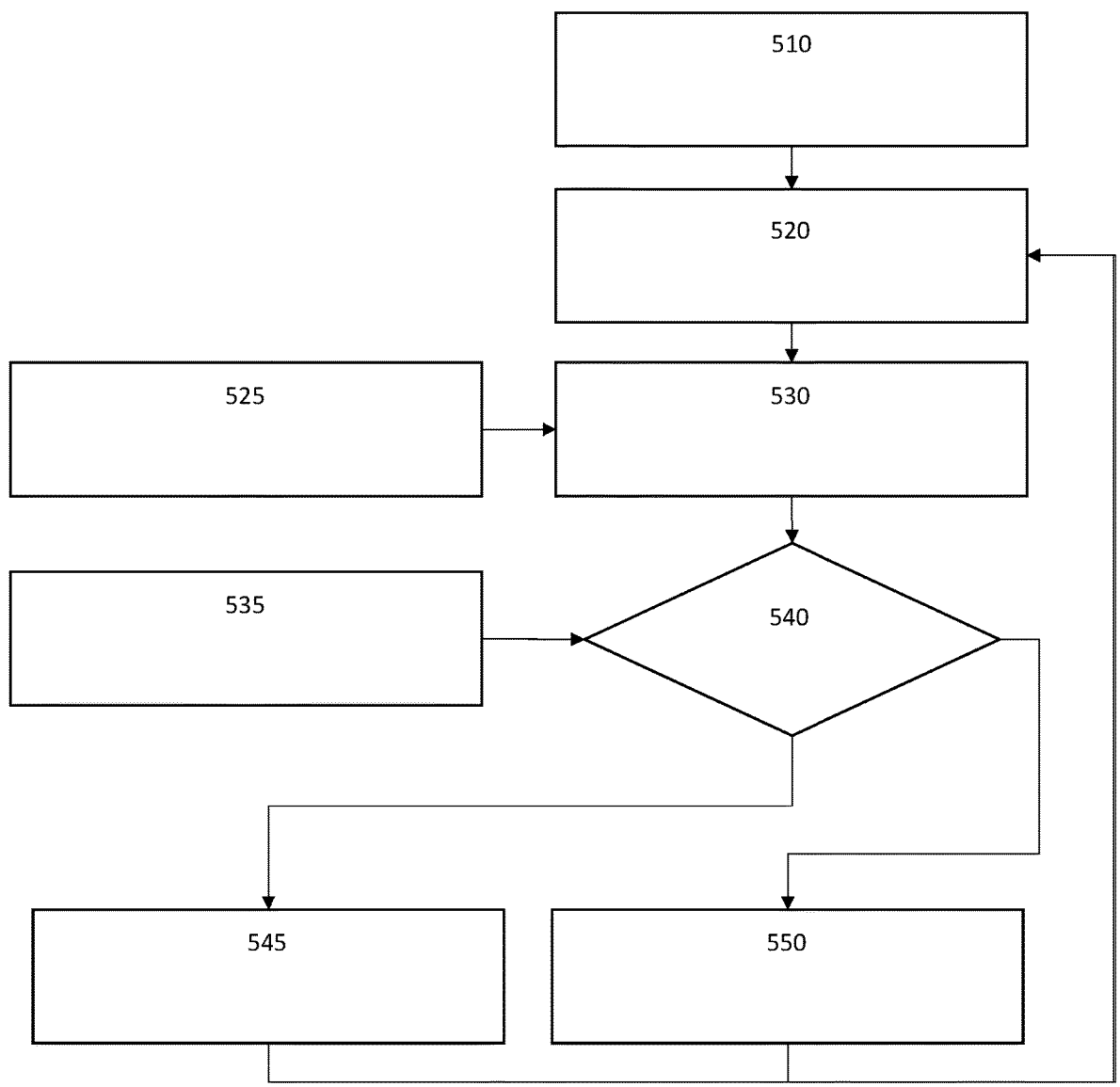
FIG. 5 shows a flow chart illustrating an exemplary implementation of a method for performing a steering wheel angle sensor estimation and validation in accordance with embodiments of the present disclosure is shown.

Turning now to FIG. 5, a flow chart illustrating an exemplary implementation of a method 500 for performing a steering wheel angle sensor estimation and validation in accordance with embodiments of the present disclosure is shown. The method 500 is first operative to receive 510 primary and secondary torque sensor output and requested electric motor command. In response to the primary and secondary torque sensor output and requested electric motor command, the method 500 is next configured to determine 520 the steering wheel angle, column torque value and actual motor torque using a factory default model. These output values can include the steering wheel angle, steering column angle and delivered motor torque.

The state observer 530 is then configured to receive 525 the steering wheel angle, column torque value and actual motor torque, the primary and secondary torque sensor output and requested electric motor command and input noise and determines a corrected steering wheel angle, steering column angle and delivered motor torque. The method next determines if a magnitude of a difference between estimated steering angle and the corrected steering wheel angle exceeds a threshold value. In addition, the method determines 540 if a magnitude of a difference between the estimated steering angle rate and the actual steering angle rate exceed a threshold value. In some exemplary embodiments, the threshold value can be determined 535 in response to vehicle speed and error and time duration above the predefined calibration angle value. If the threshold values are not exceeded, the method 500 activates 545 the DSBC or TVSC with no additional remedial actions. The method 500 then returns to performing the HWA default model. If the threshold values are exceeded, the method 500 determines 550 a steering and degradation state and sets a required remedial action. Depending on the degradation state, the method 500 can then returns to performing the HWA default model.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A vehicle control system comprising:
   a road wheel angle sensor configured to detect a road wheel angle;
   a steering feedback motor configured to rotate a steering wheel in response to the road wheel angle and to generate a steering torque value in response to a physical rotation of the steering wheel by a vehicle driver;
   a processor configured to receive the road wheel angle and the steering torque value, to estimate a steering wheel angle in response to the steering torque value and to generate a validated steering angle in response to a difference between the road wheel angle and the steering wheel angle being less than a threshold value; and
   a steering controller configured to control the steering of a vehicle in response to the validated steering angle.

2. The vehicle control system of claim 1 wherein the road wheel angle is detected in response to a failure of a first steering angle sensor.

3. The vehicle control system of claim 1 wherein the steering torque value is determined using a Kalman filter in response to a requested motor command, a torque sensor output, and an input noise.

4. The vehicle control system of claim 1 wherein the steering controller is configured to perform a dynamic backup steering control function in response to the validated steering angle.

5. The vehicle control system of claim 1 wherein the processor is further configured to perform a diagnostic and remedial action in response to the difference between the road wheel angle and the steering wheel angle exceeding the threshold value.

6. The vehicle control system of claim 1 further including a steering angle sensor and wherein the road wheel angle is detected in response to a failure of the steering angle sensor.

7. The vehicle control system of claim 1 wherein the steering controller is configured to perform a torque vector steering control (TVSC) function in response to the validated steering angle.

8. The vehicle control system of claim 1 wherein the threshold value is determined in response to a host vehicle speed, a time duration, and a magnitude of an estimated angle error.

9. The vehicle control system of claim 1 wherein the steering controller further includes a steering motor for adjusting the road wheel angle in response to the validated steering angle.

10. A method for controlling the steering of a vehicle comprising:
    detecting, by a road wheel actuator, a road wheel angle;
    detecting, by a processor, a steering torque value from a steering feedback motor in response to a physical rotation of a steering wheel by a vehicle driver;
    determining a steering wheel angle in response to the steering torque value;
    generating, by the processor, a validated steering angle in response to a difference between the road wheel angle and the steering wheel angle being less than a threshold value;
    controlling, by a steering controller, a vehicle steering direction in response to the validated steering angle.

11. The method for controlling the steering of a vehicle of claim 10 wherein the road wheel actuator includes a road wheel angle sensor for detecting the road wheel angle and a steering motor for controlling the road wheel angle in response to a steering control signal generated by the steering controller.

12. The method for controlling the steering of a vehicle of claim 10 further including detecting a failure of a steering wheel angle sensor and wherein the road wheel angle is detected in response to the failure of the steering wheel angle sensor.

13. The method for controlling the steering of a vehicle of claim 10 wherein the validated steering angle is refined using a Kalman filter in response to the steering torque value, the road wheel angle and an input noise.

14. The method for controlling the steering of a vehicle of claim 10 wherein the threshold value is determined in response to the steering wheel angle and a steering angle rate of change.

15. The method for controlling the steering of a vehicle of claim 10 wherein the steering feedback motor is mechanically coupled to the steering wheel of the vehicle.

16. The method for controlling the steering of a vehicle of claim 10 wherein the validated steering angle is used to perform at least one of a dynamic backup steering control function and a torque vector steering control function.

17. The method for controlling the steering of a vehicle of claim 10 wherein the road wheel actuator includes a first road wheel angle sensor and a second road wheel angle sensor and wherein the road wheel angle is determined in response to a mathematical combination of a first output of the first road wheel angle sensor and a second output of the second road wheel angle sensor.

18. The method for controlling the steering of a vehicle of claim 10 wherein the steering controller is further operative to generate a steering control signal in response to the validated steering angle and wherein the steering control signal is coupled to a steering motor within the road wheel actuator.

19. A steering control system in a host vehicle comprising:
a road wheel actuator having a road wheel angle sensor configured to detect a road wheel angle and a steering motor configured to control the road wheel angle in response to a steering control signal;
a steering wheel actuator including a steering angle sensor configured to detect a steering wheel angle and a steering feedback motor configured to rotate a steering wheel in response to the road wheel angle and configured to generate a steering torque value in response to a physical rotation of the steering wheel by a vehicle driver; and
an electronic control unit configured to receive the road wheel angle and the steering torque value, to estimate the steering wheel angle in response to a failure of the steering angle sensor, and to generate the steering control signal corresponding to the estimated steering wheel angle in response to a difference between the road wheel angle and the estimated steering wheel angle being less than a threshold value, wherein the steering of the host vehicle is controlled in response to the steering control signal.

20. The steering control system in a host vehicle of claim 19, further including an inertial measurement unit configured to detect a lateral acceleration of the host vehicle and wherein the electronic control unit is further configured to perform a torque vector steering control function to calculate a required torque vectoring command in response to the lateral acceleration and wherein the steering control signal is determined in response to the required torque vectoring command to directionally control the host vehicle.

* * * * *